United States Patent
Dieckmann et al.

[11] Patent Number: 5,949,168
[45] Date of Patent: Sep. 7, 1999

[54] ELECTRIC MOTOR ASSEMBLY AND A BRAKE ACTUATOR INCORPORATING SAID ELECTRIC MOTOR ASSEMBLY

[75] Inventors: Thomas Dieckmann, Pattensen; Wulf Leitermann, Hannover; Immanuel Henken, Lauenau, all of Germany

[73] Assignee: Continental Aktiengesellschaft, Hannover, Germany

[21] Appl. No.: 09/040,945

[22] Filed: Mar. 19, 1998

[30] Foreign Application Priority Data

Mar. 21, 1997 [DE] Germany .......................... 197 11 851

[51] Int. Cl.$^6$ ..................................................... H02K 7/10
[52] U.S. Cl. ..................... 310/75 R; 310/75 C; 310/76; 310/77; 310/80; 310/92; 188/71.8; 188/71.7; 188/72.4; 188/171
[58] Field of Search ............................... 310/75 C, 75 R, 310/76, 77, 80, 92; 188/71.8, 72.4, 71.7, 171; 192/412

[56] References Cited

U.S. PATENT DOCUMENTS

| | | | |
|---|---|---|---|
| 4,699,253 | 10/1987 | Sauvee et al. ........................ | 188/71.9 |
| 4,784,245 | 11/1988 | Fabbro et al. ....................... | 188/196 D |
| 4,838,391 | 6/1989 | Schenk ................................. | 188/171 |
| 4,921,078 | 5/1990 | Sommer ............................... | 188/171 |
| 5,219,049 | 6/1993 | Unterborn ............................ | 188/156 |
| 5,248,017 | 9/1993 | Schwarbich ......................... | 192/8 R |
| 5,388,674 | 2/1995 | Severinsson ......................... | 188/171 |
| 5,433,297 | 7/1995 | Kuivamaki ........................... | 188/71 |
| 5,586,630 | 12/1996 | Orzal .................................... | 192/4 R |
| 5,782,322 | 7/1998 | Hauck et al. ......................... | 188/72.4 |
| 5,796,192 | 8/1998 | Riepl .................................... | 310/67 R |

FOREIGN PATENT DOCUMENTS 3825114  1/1990  Germany .

*Primary Examiner*—Elvin G. Enad
*Attorney, Agent, or Firm*—Walter Ottesen

[57] ABSTRACT

The invention relates to an electric motor having a locking device and a brake actuator for an electric system which includes such an electric motor. The locking brake has a simple configuration and includes a conical ring which is mounted so as to be axially displaceable on the motor shaft of the electric motor of the brake actuator. In a first axial position, the conical ring (26) permits a rotation of the motor shaft (12) in both directions and, in a second axial position, the conical ring is in engagement with the motor shaft (12) and rotates with the latter. In the second axial position of the conical ring (26), a rotation of the motor shaft (12) in one rotational direction leads to the situation that the conical ring (26) is in engagement with the lock ring (24) of the brake actuator (2). The lock ring (24) is fixed so that it cannot rotate relative to the motor shaft (12). In contrast, a rotation of the motor shaft (12) in the other rotational direction leads to the situation that the contact engagement between the motor shaft (12) and the conical ring (26) and between the lock ring (24) and the conical ring (26) is released.

6 Claims, 2 Drawing Sheets ly shall become evident from the detailed description of the drawings provided below. # ELECTRIC MOTOR ASSEMBLY AND A BRAKE ACTUATOR INCORPORATING SAID ELECTRIC MOTOR ASSEMBLY

FIELD OF THE INVENTION

The invention relates to an electric motor which has at least the following components: a motor shaft rotatable in two directions; a locking brake movable between first and second positions; and, an actuating device with which the locking brake is transferrable from the first position into the second position. In the first position, a rotation of the motor shaft is permitted unimpeded in both directions and, in the second position, a rotation of the motor shaft in one rotational direction is inhibited.

The invention also relates to a brake actuator for an electric brake system. The brake actuator incorporates the electric motor assembly. Brake actuators of this kind include a clamping device which is operatively connected to the motor shaft of the electric motor.

BACKGROUND OF THE INVENTION

An electric actuator for an electric brake system wherein the brake actuator is equipped with an electric motor of the above-mentioned type is disclosed, for example, in U.S. Pat. No. 5,219,049. The brake actuator includes an electric motor having a motor shaft to which rotation is imparted when the brake actuator is actuated. Brake linings are pressed against a brake drum or against a brake disc via a gear assembly. Furthermore, the brake actuator includes a locking brake which is built up as explained below. At the end of the motor shaft facing away from the gear assembly, a friction plate is mounted which rotates with the motor shaft when the electric motor is actuated. Opposite this friction plate, a further friction plate is mounted so that it cannot rotate and this friction plate is axially movable with respect to the first-mentioned friction plate. Usually, an air gap is present between the two friction plates so that the rotation of the motor shaft is unimpeded in both rotational directions when the brake actuator is actuated. However, if one wheel brake is to be locked with the aid of the brake actuator, then the brake linings are pressed against the brake drum by the actuation of the brake actuator and therefore a braking force is generated. Thereafter, and with the aid of a second electric motor, movement is imparted to the second friction plate in an axial direction so that the air gap between the two friction plates disappears and the two friction plates are pressed against each other so as to be friction tight. As a consequence of the foregoing, a rotation of the motor shaft of the first electric motor is prevented so that the brake actuator cannot be reversed by restoring forces and so that the previously adjusted braking force is maintained at the corresponding wheel.

The brake actuator disclosed in U.S. Pat. No. 5,219,049 is equipped with the locking brake and is so configured that the locking brake is without current in the "released state" as well as in the "unreleased state" and, in this way, the second motor, which is assigned to the locking brake, consumes a negligible current. The assembly of the electric locking brake is, however, complex. Furthermore, the brake actuator having a locking brake and disclosed in U.S. Pat. No. 5,219,049 exhibits an element of risk. More specifically, if the electric locking brake is unintentionally actuated because of a technical error or by the driver of the vehicle, this leads to a locking of the motor shaft of the electric motor of the brake actuator and the brake actuator can only then be actuated again when the electric locking brake is specifically released. An automatic release of the locking brake is not possible. In this way, a malfunction of the brake actuator occurs when there is an unintended and unplanned actuation of the locking brake.

SUMMARY OF THE INVENTION

It is an object of the invention to provide an electric motor assembly having a locking brake wherein the locking brake has a simple configuration and is furthermore so configured that the above-mentioned disadvantages are avoided. Furthermore, it is an object of the invention to provide an electric motor assembly which is suitable for installation in brake actuators.

The electric motor assembly of the invention includes: a frame; an electric motor having a motor shaft defining a rotational axis; means for rotatably journalling the motor shaft in the frame so as to be rotatable in a clockwise rotational direction and in a counterclockwise rotational direction; and, a locking device mounted in the frame and the locking device including: an annular member disposed in surrounding relationship to the motor shaft and being axially displaceable relative thereto along the axis between a first position wherein the locking device permits rotational movement of the motor shaft in both of the rotational directions and a second position wherein the annular member and the motor shaft conjointly define a first contact interface whereat the annular member is in locking engagement with the motor shaft so as to rotate therewith; actuating means for operating on the annular member for transferring the annular member from the first position into the second position; a lock ring mounted on the frame so that the lock ring cannot rotate relative to the motor shaft; and, the lock ring and the annular member being so configured that a rotation of the motor shaft in one of the rotational directions causes the annular member to come into locking engagement with the lock ring at a second contact interface thereby preventing further rotation of the motor shaft in the one rotational direction while the annular member is in the second position whereas, a rotation of the motor shaft in the other one of the rotational directions causes the locking engagement to become disengaged at both the first contact interface and the second contact interface.

Preferably, the ring or annular member, which is movably mounted on the motor shaft, is configured as a conical ring which can be moved between the first and second positions. In the first position, a rotation of the motor shaft in both rotational directions is permitted without hindrance. In the second position, and with a rotation of the motor shaft in one rotational direction, the conical ring is rotated into the lock ring which is fixed to the housing of the motor. The conical ring is then clamped between the motor shaft and the lock ring and prevents a rotation of the motor shaft.

The advantages achieved with the invention are especially seen in that the locking device of the electric motor is simply configured and comprises only a few components. For this reason, it is possible to build the locking device into the electric motor with little use of space so that the electric motor, and therefore the brake actuator, into which the motor is built, increases not at all or only slightly because of the incorporation of the locking brake or locking device.

A further advantage of the invention is that the locking device of the electric motor can be released in a simple manner. For this purpose, the electric motor needs only to be actuated in the rotational direction which leads to a loosening or disengagement of the annular member from the lock ring mounted so as to be fixed against rotation. A further advantage of the invention is that the locking device always permits a rotation of the motor shaft in one rotational direction. Preferably, with a rotation in this rotational direction, the brake linings are moved toward the brake disc so that a braking force is generated with the brake actuator for any desired position of the locking brake. Accordingly, a dangerous malfunction of the brake actuator cannot occur because of an unwanted tensioned locking or park brake.

According to a further embodiment of the invention, the meshing or engagement between the annular member and the motor shaft in the second position of the annular member takes place via a frictional lock. In this case, the annular member is configured as a conical ring and the motor shaft has a friction cone onto which the conical ring is pushed to the second position. The advantage of this further embodiment is that the conical ring has a simple configuration and can be pushed onto the frictional cone of the motor shaft in any angular position.

According to another feature of the invention, the engagement between the conical ring and the motor shaft in the second position of the ring is provided via a form lock. The advantage of this further embodiment is that a form lock is independent of the coefficient of friction between the ring and the motor shaft so that this material parameter does not have to be considered when selecting the materials for the motor shaft and the ring.

According to still another feature of the invention, the engagement between the ring and the anchoring of the brake shaft takes place via a form lock. The anchoring or lock ring of the brake actuator is fixed in rotation relative to the motor shaft.

The actuating device moves the annular member from the first axial position into the second axial position. According to another feature of the invention, this actuating device can be configured so as to be mechanical, electromagnetic or electromotoric. A mechanical actuating device can, for example, be realized with a Bowden cable as used in present-day parking brakes in motor vehicles. A Bowden cable of this kind can be actuated by a hand lever so that a driver of the motor vehicle does not have to make any adaptation for a configuration of this kind of actuating device. In contrast, the advantage of an electromagnetic actuating device is that it can be realized in a compact configuration and requires only a small amount of energy.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
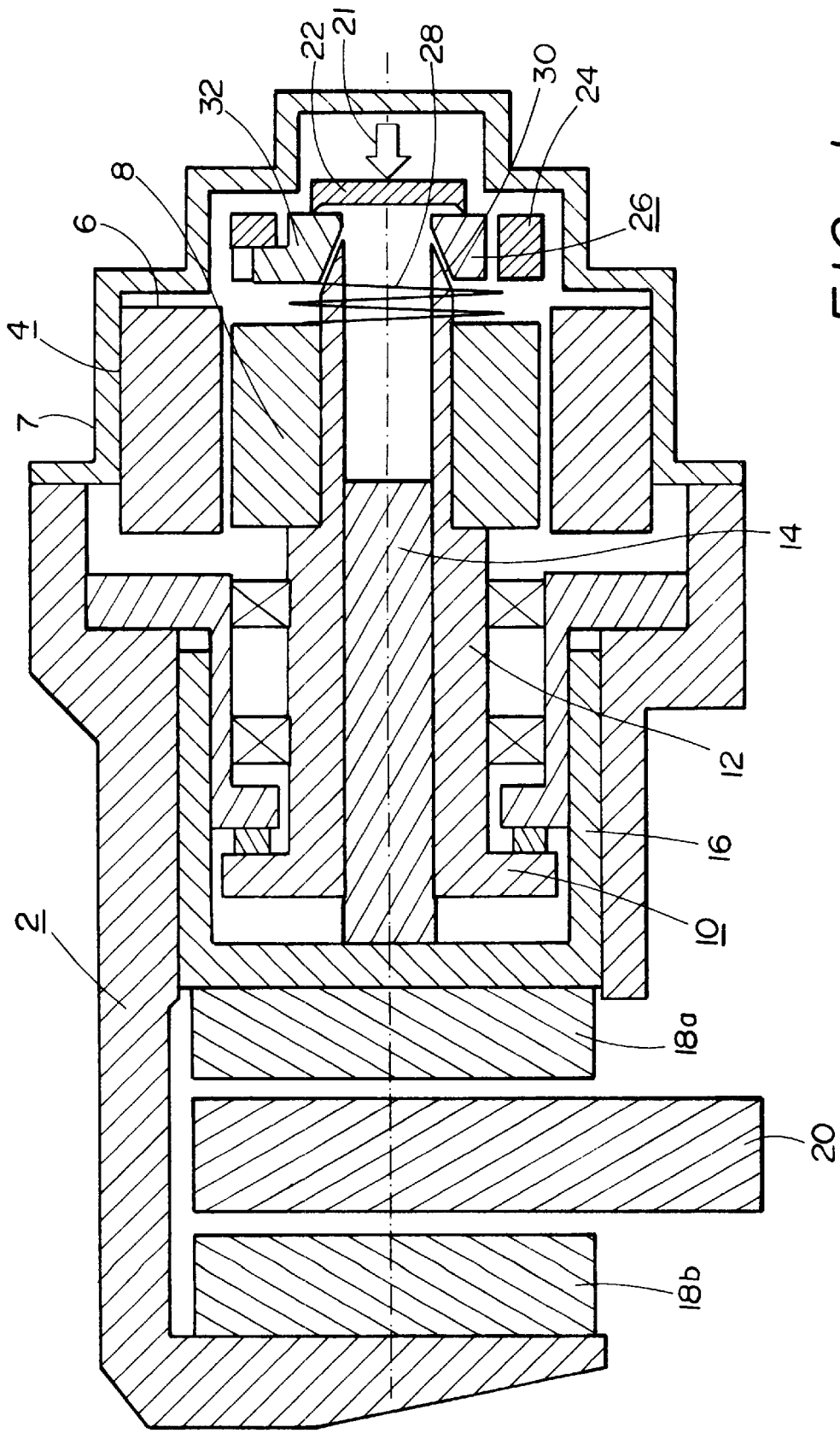
FIG. 1 is an elevation view, in section, of a brake actuator of the invention equipped with an electric motor of the invention; and, FIG. 2 is a perspective exploded view showing the locking device.

FIG. 1 shows only those components of the brake actuator which are needed to provide a description of the invention.

The brake actuator 2 includes an electric motor 4 having a stator 6 fixed to the housing 7. The electric motor 4 also includes a rotor 8 which is operatively connected to a motor shaft 12 of a clamping device 10. In this way, an operative connection is established between the electric motor 4 and the clamping device 10.

During a braking operation, a rotational movement is imparted to the rotor 8 and therefore to the motor shaft 12 by the electric motor 4 in a counterclockwise direction when viewed in the direction (arrow 21) through the actuating device 22 on the motor shaft 12. The rotation of the motor shaft 12 is transmitted to a spindle rod 14 and is converted into an axial movement of the spindle rod 14. Because of this axial movement, the spindle rod 14 drives a brake piston 16 so that the brake linings (18a, 18b) are pressed against the brake disc 20 by the brake piston 16 whereby a braking force is developed. After the end of the braking operation, the electric motor 4 is driven so that the motor shaft 12 rotates in the clockwise direction. In this case too, the rotation of the motor shaft 12 is transferred to the spindle rod 14 and the brake piston 16 so that, in turn, an axial movement is imparted to the spindle rod 14 and the brake piston 16. A defined air gap is adjusted between the brake disc 20 and the brake linings (18a, 18b) because of a pregiven axial movement of the spindle rod 14 and of the brake piston 16.

Details of an arrangement showing the above operative connection between the motor shaft 12 and spindle rod 14 are disclosed, for example, in copending U.S. patent application Ser. No. 08/653,132, filed May 24, 1996, incorporated herein by reference.

In addition to the components discussed above, the brake actuator 2 includes a locking brake comprising an actuating device 22, a lock ring 24 fixed to the housing 7, an annular member in the form of a conical ring 26 and a spring 28. With the actuating device 22, the conical ring 26, which is disposed on the motor shaft 12, can be displaced in axial position against the spring force of the spring 28. In the first axial position, the teeth 32 of the conical ring 26 vanish into the recesses 34 of the lock ring 24 (see FIG. 2) so that, in this axial position, the conical ring 26 cannot be rotated with respect to the lock ring 24. The second axial position of the conical ring 26 is characterized in that the teeth 32 of the conical ring 26 are pushed out in part from the recesses 34 of the lock ring 24. In this position, the conical ring 26 can be rotated in the clockwise direction (viewed in the direction of arrow 21 through the lock ring 24 on the conical ring 26) relative to the lock ring until the inclined flats 36 of the teeth 32 of the conical ring 26 are in meshing engagement with the ramps 38 of the recesses 34 of the lock ring 24. As soon as the inclined flats 36 of the teeth 32 lie upon the ramps 38 of the recesses 34, the conical ring 26 rotates tight on the lock ring 24. A rotation in the counterclockwise direction is possible until the flanks 40 of the teeth 32 come into abutment on corresponding side walls 42 of the recesses 34 of the lock ring 24 (see FIG. 2).

Figure 2:
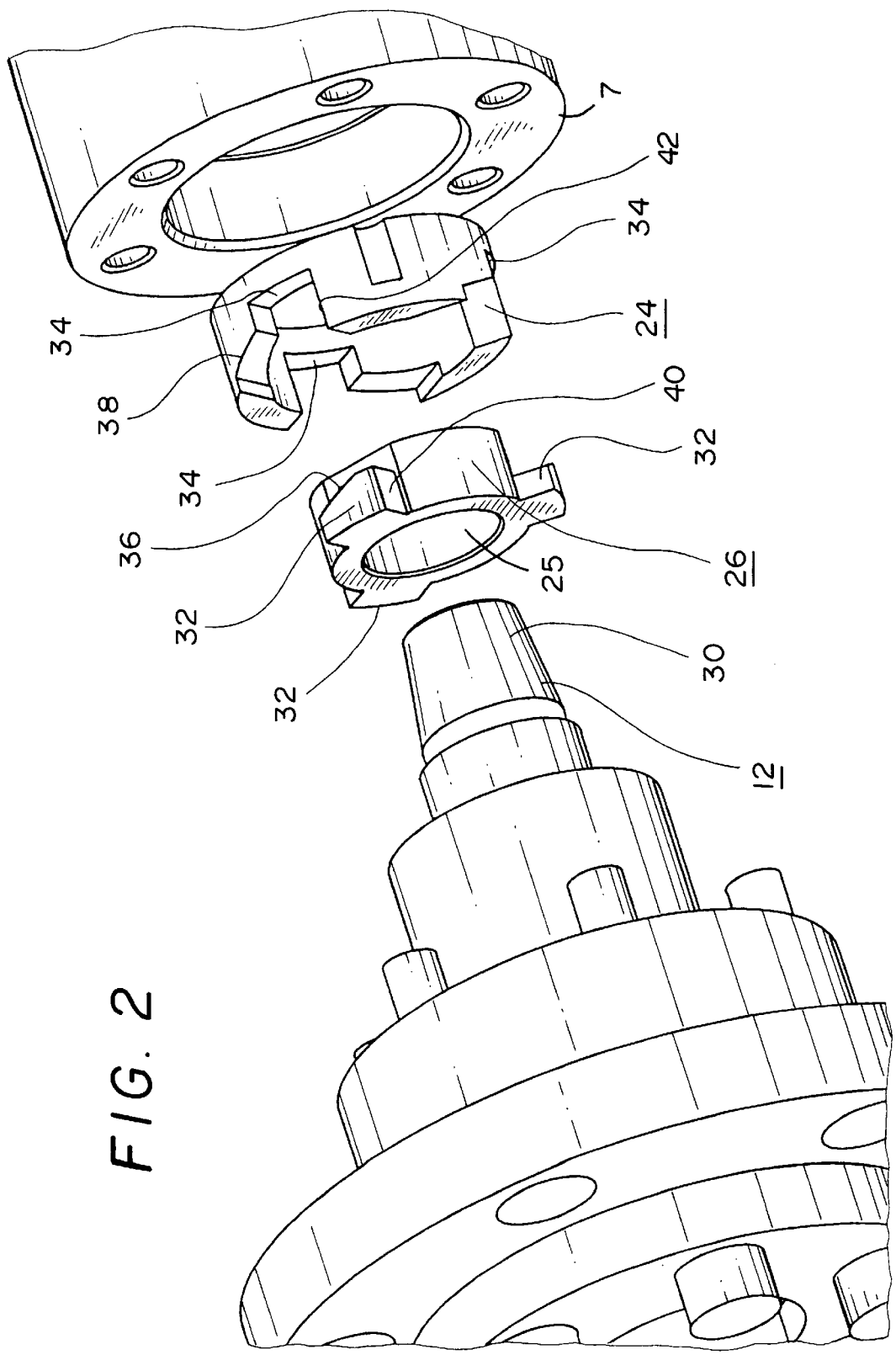

The following will explain with reference to FIGS. 1 and 2 how a motor vehicle wheel, which is assigned to the brake actuator 2, can be locked with the aid of the locking brake.

The brake actuator 2 is actuated via the electric motor 4, for example, by actuating a switch (not shown) in the control panel of the motor vehicle. First, the brake actuator 2 is actuated via the electric motor 4 until the brake linings (18a, 18b) lie against the brake disc 20 whereby a brake force is generated on the corresponding wheel. Thereafter, the conical ring 26 is pushed in the direction of arrow 21 from its first position into its second position against the spring force of spring 28 via the actuating device 22. In the first position, the teeth 32 are disposed in the recesses 34 and, in the second position, the teeth 32 are pushed out, in part, from the recesses 34. An axial displacement of the conical ring 26 by the actuating device 22 is possible until the cone 25 of the conical ring 26 is in engagement with the cone 30 of the motor shaft 12 and the conical ring 26 sits tightly on the motor shaft 12.

When the conical ring 26 is on the motor shaft 12, the conical ring 26 is rotated back with the motor shaft 12 in the clockwise direction until the inclined flats 36 of the teeth 32 of the conical ring 26 are in contact engagement against the ramps 38 of the recesses 34 of the lock ring 24. A further rotation of the motor shaft 12 in the clockwise direction leads to the situation that the conical ring 26 rotates tight in the lock ring 24 via the inclined flats 36. The motor shaft 12 does not rotate further and the brake linings (18a, 18b) are fixed on the brake disc 20 because the return forces in the brake actuator 2 are not adequate to rotate the motor shaft 12 relative to the conical ring 26 seated tightly on the motor shaft 12.

The locking brake is released in the manner described below.

The electric motor 4 is, for example, driven in such a manner (by again actuating the switch in the control panel) that the rotor 8 and therefore the motor shaft 12 rotate in the counterclockwise direction. As a consequence thereof, the conical ring, which is seated tightly on the motor shaft 12, rotates also in the counterclockwise direction and the inclined flats 36 of the teeth 32 lift from the ramps 38 of the recesses 34 when the electric motor develops an adequately large force. With a further rotation in the counterclockwise direction, the flanks 40 of the teeth 32 abut on the side walls 42 of the recesses 34 so that the cone of the conical ring 26 can no longer rotate opposite to the clockwise direction because the lock ring 24 is fixedly mounted to the housing 7.

If the electric motor is driven with a sufficiently large force, then the motor shaft 12 rotates alone farther in the counterclockwise direction and the conical ring 26 breaks loose from the cone 30 of the motor shaft 12. After the conical ring 26 breaks loose from the motor shaft 12, the conical ring 26 is displaced by the spring 28 from its second axial position into the first axial position so that the teeth 32 of the conical ring 26 again vanish into the recesses 34 of the lock ring 24. Thereafter, the motor shaft 12 of the brake actuator 2 is again free to rotate in both rotational directions and the locking brake is released so that the brake actuator is again available for normal braking operations.

Although the electric motor has been described in the context of a brake actuator, it is understood that the application of the electric motor is not so limited.

It is understood that the foregoing description is that of the preferred embodiments of the invention and that various changes and modifications may be made thereto without departing from the spirit and scope of the invention as defined in the appended claims.

What is claimed is:

1. An electric motor assembly comprising:

a frame;

an electric motor having a motor shaft defining a rotational axis;

means for rotatably journalling said motor shaft in said frame so as to be rotatable in a clockwise rotational direction and in a counterclockwise rotational direction; and, a locking device mounted in said frame and said locking device including:

an annular member disposed in surrounding relationship to said motor shaft and being axially displaceable relative thereto along said axis between a first position wherein said locking device permits rotational movement of said motor shaft in both of said rotational directions and a second position wherein said annular member and said motor shaft conjointly define a first contact interface whereat said annular member is in locking engagement with said motor shaft so as to rotate therewith;

actuating means for operating on said annular member for transferring said annular member from said first position into said second position;

a lock ring mounted on said frame so that said lock ring cannot rotate relative to said motor shaft; and, said lock ring and said annular member being so configured that a rotation of said motor shaft in one of said rotational directions causes said annular member to come into locking engagement with said lock ring at a second contact interface thereby preventing further rotation of said motor shaft in said one rotational direction while said annular member is in said second position whereas, a rotation of said motor shaft in the other one of said rotational directions causes the locking engagement to become disengaged at both said first contact interface and said second contact interface.

2. The electric motor assembly of claim 1, said first contact interface defining a frictional interlock when said annular member is in said second position.

3. The electric motor assembly of claim 1, said first contact interface defining a form-fit interlock.

4. The electric motor assembly of claim 1, said second contact interface defining a form-fit interlock.

5. A brake actuator for a vehicle brake having a brake pad defining a friction lining and a brake disc or the like for coacting with the brake pad, the brake actuator comprising:

a frame;

an electric motor having a motor shaft defining a rotational axis;

means for rotatably journalling said motor shaft in said frame so as to be rotatable in a clockwise rotational direction and in a counterclockwise rotational direction;

conversion means for converting the rotational movement of said rotor into a linear movement along said axis;

transmission means coacting with said conversion means for transmitting said linear movement to said brake pad so as to bring said brake pad into contact engagement with said brake disc; and, a locking device mounted in said frame and said locking device including:

an annular member disposed in surrounding relationship to said motor shaft and being axially displaceable relative thereto along said axis between a first position wherein said locking device permits rotational movement of said motor shaft in both of said rotational directions and a second position wherein said annular member and said motor shaft conjointly define a first contact interface whereat said annular member is in locking engagement with said motor shaft so as to rotate therewith;

actuating means for operating on said annular member for transferring said annular member from said first position into said second position;

a lock ring mounted on said frame so that said lock ring cannot rotate relative to said motor shaft; and, said lock ring and said annular member being so configured that a rotation of said motor shaft in one of said rotational directions causes said annular member to come into locking engagement with said lock ring at a second contact interface thereby preventing further rotation of said motor shaft in said one rotational direction while said annular member is in said second position whereas, a rotation of said motor shaft in the other one of said rotational directions causes the locking engagement to become disengaged at both said first contact interface and said second contact interface.

6. The brake actuator of claim 5, said first contact interface defining a frictional interlock when said annular member is in said second position.

* * * * *